Patented July 15, 1952

2,603,567

UNITED STATES PATENT OFFICE 2,603,567

FEED SUPPLEMENT

Hugh R. Stiles, St. Mary-of-the-Woods, Ind., assignor to Commercial Solvents Corporation, Terre Haute, Ind., a corporation of Maryland No Drawing. Application January 20, 1951, Serial No. 207,065

9 Claims. (Cl. 99—2)

The present invention relates to a new and improved livestock feed supplement derived from sugar-containing materials. More particularly, it relates to a feed supplement for ruminants derived from ammonia and sugar-containing materials such as molasses and the like.

Shortages of the most desirable forms of naturally occurring feedstuffs have made it necessary from time to time to use various substitutes deficient in one or more of the elements essential in a balanced ration. It has been the custom for some time, therefore, to formulate feedstuffs using varying quantities of different materials so as to give a mixture having the proportions of the various food constituents desirable for feeding purposes. This practice has several advantages in that it provides a method of utilizing materials which would otherwise either go to waste or else be inefficiently used and also it permits the formulation of feedstuffs designed for specific feeding purposes.

Among the materials which have been frequently used on an extensive scale as mixed feed constituents are materials containing varying amounts of different types of sugars, usually resulting as a by-product from the manufacture of foodstuffs for human consumption, as for example, cane or blackstrap molasses, hydrol syrup, and the like. Another somewhat similar sugar-containing material, used on a somewhat lesser scale is the syrup obtained by the concentration of the molasses mash from which fermentation ethyl alcohol has been removed by distillation. This product is referred to in the trade as "CDMS" (condensed distillers molasses solubles).

Sugar-containing syrups, such as cane molasses, are very palatable and are much relished by livestock and when mixed with other materials induce the stock to eat roughage and less palatable materials with less waste of the latter than there would be otherwise. When thus fed molasses may be worth fully as much or even more than corn or other grain and in fact is one of the cheapest sources of carbohydrates for the feed manufacturer. In addition, sugar-containing materials such as cane molasses have a mild laxative effect that is beneficial when the other feeds in the ration are constipating.

The most readily available sugar-containing materials suitable for livestock feeding are probably cane or blackstrap molasses, inverted molasses, hydrol syrup, and "CDMS."

Cane or blackstrap molasses of the usual grade contains 55% or more of sugars, which are the only important organic nutrients. It contains only approximately 2.8% nitrogen calculated as protein, on the average, and hence when large amounts of molasses are fed it is especially important that sufficient protein be furnished by the rest of the ration in order to give a satisfactorily balanced mixed feed.

In the past, it has been customary when using molasses as a feed constituent to make up the protein deficiency by incorporating in the feed mixture expensive protein-containing materials such as soybean oil meal, cottonseed oil meal, and the like.

Attempts have also been made to make up the protein deficiency by incorporating in the feed other nitrogen-containing materials such as urea and ammonium salts. None of these or other suggested materials has been a completely satisfactory substitute for the desired proteins for a number of reasons. Ammonium salts and urea are utilized to a limited degree but are relatively toxic and since they are not readily mixed uniformly with the feeds have occasionally caused the death of animals which do not possess digestive systems permitting of efficient utilization of high concentrations of nitrogen in such forms.

I have now discovered that ammonia may be readily and economically converted into a form which may be efficiently utilized by ruminants by subjecting the ammonia to reaction with sugar-containing materials such as cane or blackstrap molasses, inverted molasses, wood sugar molasses, hydrol syrup, "CDMS," citrus molasses (condensed citrus solubles), and the like. The product thus obtained retains many of the advantageous properties of the original sugar-containing materials with the added advantage that it is no longer deficient in nitrogen which can be efficiently utilized by livestock. By means of a relatively inexpensive ammonization step the sugar-containing materials are thus converted into highly satisfactory feed supplements with which balanced mixed livestock feeds can be produced at a substantially lower cost than with other previously available materials.

My new nitrogen-containing feed supplement is prepared by subjecting a sugar-containing liquid, having at least about 25% but not in excess of about 85% solids therein, to reaction with ammonia in either the aqueous, gaseous, or anhydrous liquid form. While the reaction can be carried out at room temperature long periods of time are ordinarily required in order to give the desired degree of ammonization. This is particularly the case if the ammonia is used in dilute form, for example, as aqueous ammonia solution. I find it desirable, therefore, to carry out the process at moderately elevated temperatures. The reaction rate is accelerated as the temperature rises and hence it is desirable to carry out the reaction at as high temperature as possible in order to complete the ammoniation in the shortest period of time. However, because of the danger of caramelization of the sugar and other reactions which take place in the complex sugar-containing mixtures of commerce which are available at low enough prices to be used as ingredients of animal feeds, the maximum temperature utilizable in my process is somewhat below that at which most rapid ammoniation takes place. While the reaction may be effected at temperatures ranging from 20 to 150° C. most satisfactory results are obtained at temperatures ranging from 60 to 80° C. when the operation is carried on as a batch process. Under such condition heating for 6 to 12 hours gives a satisfactory product. If room temperature is employed long reaction periods running into several weeks time are required. By carrying out the reaction at temperatures of the order of 110° C. satisfactory ammoniation is effected within the period of one to two hours. When the reaction temperature is raised still higher it is necessary to reduce the reaction time proportionally. At the higher temperature the operation is more easily regulated by pumping the mixture of reactants through a heated tube. The reaction can then be regulated by varying the diameter and length of the heated section of the reactor tubes and the temperature of the reactor and the rate of flow of the reactants therethrough. Under such operating conditions temperatures up to the order of 140° C. have been found to give satisfactory results when heating for periods of time ranging from 5 minutes to approximately 15 minutes. Heating to approximately 130° C. for about 15 minutes gives a very satisfactory product. Under such conditions it is usually necessary to apply pressure to the reaction system in order to keep the ammonia in solution and thus maintain the reactants in the liquid phase. The amount of pressure is not critical however and I prefer to use only so much as is necessary in order to maintain the liquid phase. At temperatures in excess of those described, substantial caramelization and excessive darkening and other changes in the sugar-containing solutions begin to take place, and a final product decidedly less desirable for use as a feed ingredient results.

The use of aqueous ammonia is generally undesirable because of the excessive dilution of the resulting final product, the concentration of which would be impractical and excessively costly. Ammoniation is therefore preferably effected by either passing gaseous anhydrous ammonia into the sugar-containing solution being ammoniated until saturated or the desired concentration has been obtained and then heating the resulting solution at the desired temperature until fixation of the ammonia has been attained and then adding additional ammonia, if required, to give a final product of the desired degree of fixed nitrogen content. Or, if preferred, the ammonia in the desired form may be added to the previously heated sugar-containing solution. Obviously, the operation may be carried out either continuously or as a batch operation. If pressure and suitable mixing equipment are available, suitable quantities of anhydrous liquid ammonia can be mixed with the sugar-containing liquids instead of using gaseous anhydrous ammonia.

The addition of ammonia to the sugar-containing material in slight excess of that to be fixed generally gives the best results. However, the presence of excessive amounts of free ammonia in the final product is undesirable in feed constituents. I have found that if I carry out the ammoniation so that the final pH is from about 7.5 to 9.5 the product will not contain excessive amounts of unfixed ammonia. In addition, a pH of about 9 indicates that a maximum amount of ammonia has been fixed regardless of the sugar-containing material being ammoniated. In practice, I prefer to carry out the ammoniation until a pH from about 8 to about 9 is obtained. If the final pH is in excess of 9.5, I find it desirable to adjust the pH to this value by the addition of an acid. Any acid can be satisfactorily used which does not form a toxic ammonium salt or release in the product a toxic material or a material which would be converted into a toxic material in the digestive system of the animal. I have obtained satisfactory products by the use of acids, such as hydrochloric, sulfuric, or phosphoric acids.

The following examples illustrate the preparation of my new feed supplement. It should be understood, however, that these examples are illustrative only and that I can produce satisfactory materials from other sugar-containing materials and I can vary the procedure generally as outlined above.

EXAMPLE I

Varying amounts of 28% aqueous ammonia were added to 400 grams of blackstrap cane molasses in 3-neck round bottom flasks fitted with mechanical stirrers and thermometers. Ammoniation was permitted to proceed for varying periods of time at different temperatures. Table 1 below shows the results obtained under these varying operating conditions.

*Table I*

| Expt. No. | NH$_3$ Added (Per Cent of Dry Solids), Per Cent | Time, hr. | Temp., °C | pH | Brix | Free NH$_3$ (Per Cent on Sample), Per Cent | "Fixed" N (Per Cent on Sample), Per Cent | Total N (Per Cent on Sample), Per Cent |
|---|---|---|---|---|---|---|---|---|
| Control | | | | 5.1 | 85.8 | | | 0.39 |
| 3 | 7.7 | 140 | 25-30 | 10.0 | 64.1 | 3.68 | 0.93 | 3.96 |
| 3R | 7.7 | 500 | 25-30 | 10.0 | 64.1 | 3.30 | 1.20 | 3.91 |
| 1 | 7.7 | 3 | 70 | 10.1 | 64.9 | 3.76 | 1.03 | 4.13 |
| 6 | 7.7 | 8 | 70 | 9.9 | 63.2 | 2.72 | 1.80 | 4.04 |
| 9 | 7.7 | 21 | 70 | 9.8 | 61.6 | 1.97 | 2.31 | 3.93 |
| 7 | 15.4 | 8 | 70 | 10.4 | 51.4 | 4.79 | 1.44 | 5.38 |
| 10 | 15.4 | 21 | 70 | 10.2 | 51.0 | 3.90 | 1.72 | 4.93 |
| 11 | 30.8 | 21 | 70 | 10.4 | 38.5 | 4.89 | 1.48 | 5.50 |

EXAMPLE II

Anhydrous ammonia gas was passed through a sparger into 500 grams of hydrol syrup (the mother liquor from the crystallization of dextrose from a solution containing it as a product of hydrolysis of corn starch with hydrochloric acid and containing sodium chloride from the neutralization of the acid) in varying amounts in 3-neck round-bottom flasks provided with mechanical stirrers and thermometers. Table II below shows the results of a series of expriments so conducted.

*Table II*

| Expt. No. | NH₃ Added (Per Cent of Dry Solids), Per Cent | Time, hr. | Temp., C. | pH | Brix | Free NH₃ (Per Cent on Sample), Per Cent | "Fixed" N (Per Cent on Sample), Per Cent | Total N (Per Cent on Sample), Per Cent |
|---|---|---|---|---|---|---|---|---|
| Control | | | | | 74.2 | | | |
| 35 | 3 | 7.5 | 75 | 8.1 | 68.5 | 0.53 | 1.75 | 2.19 |
| 34 | 4 | 7.5 | 75 | 8.4 | 67.1 | 0.65 | 2.08 | 2.82 |
| 36 | 5 | 7.5 | 75 | 9.8 | 63.0 | 2.20 | 2.95 | 4.76 |
| 39 | 6 | 7.5 | 75 | 9.4 | 64.4 | 1.44 | 2.76 | 3.94 |

EXAMPLE III

In this set of experiments blackstrap cane molasses was ammoniated with anhydrous ammonia gas in the manner described in Example II. The results of the experiments are shown in Table III below.

*Table III*

| Expt. No. | Molasses Taken, g. | NH₃ Added (Per Cent of Dry Solids), Per Cent | Time Heated, hr. | Temp., °C. | pH | Brix | Free NH₃ (Per Cent on Sample), Per Cent | "Fixed" N (Per Cent on Sample), Per Cent | Total N (Per Cent on Sample), Per Cent |
|---|---|---|---|---|---|---|---|---|---|
| Control | | | | | 5.1 | 85.8 | | | 0.39 |
| Do | | | | | 5.1 | 86.0 | | | 0.55 |
| 16¹ | 800 | 2.0 | 8 | 75–85 | 7.3 | 80.2 | 0.60 | 1.59 | 2.09 |
| 17¹ | 800 | 2.0 | 5 | 75–80 | 8.4 | 80.2 | 0.86 | 1.78 | 2.47 |
| 20¹ | 800 | 4.0 | 8 | 75–80 | 9.2 | 77.5 | 1.64 | 2.09 | 3.44 |
| 15 | 500 | 4.0 | 24 | 75 | 8.1 | 76.2 | 0.95 | 2.44 | 3.22 |
| 26 | 400 | 4.1 | 21 | 75 | 8.6 | 78.1 | 1.03 | 2.37 | 3.22 |
| 28¹ | 800 | 4.1 | 24 | 75 | 9.4 | 76.7 | 1.76 | 2.21 | 3.66 |
| 18 | 400 | 7.0 | 4 | 75–80 | 9.9 | 74.0 | 3.24 | 1.93 | 4.59 |
| 22 | 400 | 7.0 | 8 | 75 | 9.9 | 75.5 | 2.46 | 2.33 | 4.36 |
| 23¹ | 800 | 7.0 | 8 | 75 | 10.2 | 72.7 | 3.61 | 2.14 | 5.11 |
| 12 | 400 | 7.0 | 11.5 | 75 | 9.7 | 75.7 | 2.57 | 2.03 | 4.15 |
| 14 | 750 | 7.0 | 24 | 75 | 9.6 | 72.8 | 2.69 | 2.46 | 4.67 |
| 13 | 500 | 7.7 | 7 | 75 | 9.6 | 75.7 | 2.98 | 1.98 | 4.44 |
| 19 | 400 | 14.0 | 4 | 75–80 | 9.6 | 77.9 | 2.06 | 2.06 | 3.76 |
| 27 | 400 | 15.4 | 12 | 75 | 9.8 | 75.3 | 2.18 | 2.01 | 3.81 |

¹ Sealed reactor.

EXAMPLE IV

Blackstrap cane molasses was treated at a Brix of 75° with unpurified, autolyzed yeast at about 60° C. for seven hours. The amount of invert sugar was thus increased by an amount ranging from about 64 to 155% over the amount originally present.

Inverted cane molasses prepared as above described or by inverting with the enzyme invertase was subjected to ammoniation as described in Example II. The results of the ammoniation of 500 gram lots of inverted molasses are shown in Table IV below.

*Table IV*

| Expt. No. | NH₃ Added (Per Cent of Dry Solids), Per Cent | Time Heated, hr. | Temp., C. | pH | Brix | Free NH₃ (Per Cent on Sample), Per Cent | "Fixed" N (Per Cent on Sample), Per Cent | Total N (Per Cent on Sample), Per Cent |
|---|---|---|---|---|---|---|---|---|
| 37 | 6.0 | 7.5 | 75 | 9.4 | 64.8 | 2.22 | 3.91 | 5.74 |
| 30 | 7.0 | 7.5 | 75 | 9.4 | 63.3 | 1.80 | 3.99 | 5.47 |
| 38 | 7.0 | 12 | 75 | 9.0 | 62.8 | 1.75 | 4.06 | 5.50 |
| 29 | 7.4 | 7.5 | 75 | 9.0 | 64.0 | 1.75 | 3.59 | 5.03 |
| 31 | 8.2 | 7.5 | 75 | 9.6 | 63.1 | 2.50 | 3.76 | 5.76 |
| 32 | 9.5 | 7.5 | 75 | 9.8 | 61.9 | 3.34 | 3.96 | 6.71 |
| 33 | 10.6 | 8 | 75 | 9.8 | 62.9 | 3.32 | 3.79 | 6.53 |
| 21 | 21.7 | 7.5 | 75 | 10.0 | 55.9 | 3.18 | 3.85 | 6.47 |

EXAMPLE V

Anhydrous ammonia gas was passed through a fritted glass dispenser into 471.7 grams of wood sugar molasses in a beaker until a total of 28.3 grams of ammonia had been added. The molasses was then heated on a steam bath for approximately one hour, the pH of the wood molasses syrup at the beginning of the operation was 3.60 and its nitrogen content 0.05. At the end of the heating operation the pH was 9.45 and the nitrogen content 3.9 of which 0.8% was free NH₃ and the fixed nitrogen in the final product 3.1%.

EXAMPLE VI

Molasses distillation syrup ("CDMS"), ammoniated as described in Example II above, gave a product having a protein equivalent of 12.5%.

Feeding tests conducted with the ammoniated sugar-containing syrup described above have shown the materials to be eminently satisfactory sources of proteins for animal feed and particularly for ruminants and also to be of satisfactory palatability. In these tests various mixtures of ammoniated and unammoniated sugar-containing materials were used. Table V below gives the composition of the various ammoniated sugar-containing materials used in the feeding tests reported below.

The feed rations described in Table VI above were fed to 12 to 14 week old bull calves. Dur-

Table V

| No. | Material | Protein Equiv. Total N×6.25 (Percent on Sample) | Acid Used for Neutralization | Salt Present Kind | Amount (Percent on Sample [1]) |
|---|---|---|---|---|---|
| A | Ammoniated inverted blackstrap molasses | 26.2 | none | | |
| B | ½ Ammoniated inverted blackstrap molasses, ½ Untreated blackstrap molasses. | 11.2 | none | | |
| C | ...do... | 13.8 | $H_3PO_4$ | $(NH_4)_2HPO_4$ | 0.9 |
| D | ...do... | 13.8 | $H_2SO_4$ | $(NH_4)_2SO_4$ | 1.2 |
| E | Ammoniated inverted blackstrap molasses | 27.5 | HCl | $NH_4Cl$ | 2.8 |
| F | ...do... | 30.0 | $H_2SO_4$ | $(NH_4)_2SO_4$ | 5.2 |
| G | Ammoniated blackstrap molasses | 16.8 | HCl | $NH_4Cl$ | 0.9 |
| H | ...do... | 15.0 | $H_2SO_4$ | $(NH_4)_2SO_4$ | 1.1 |
| I | ...do... | 15.6 | $H_3PO_4$ | $(NH_4)_2HPO_4$ | 1.2 |
| J | Ammoniated inverted blackstrap molasses | 29.4 | $H_3PO_4$ | $(NH_4)_2HPO_4$ | 1.5 |
| K | Ammoniated blackstrap molasses | 15.0 | none | | |
| L | ½ Ammoniated inverted blackstrap molasses, ½ Untreated blackstrap molasses. | 13.8 | HCl | $NH_4Cl$ | 0.9 |
| M | Ammoniated hydrol syrup | 26.8 | $H_3PO_4$ | | |
| N | Ammoniated molasses distillation syrup ("CDMS"). | 12.5 | | | |

[1] Calculated from amount of acid used for neutralization of free ammonia.

The above samples of ammoniated sugar-containing syrups were used in preparing the feed rations shown in Table VI below.

ing the preliminary period of observation each received five pounds of the Control mix (Table VI) for seven days and six pounds of the same mix

Table VI
RATIONS

| Ingredient | Control | A | B | C | D | E | F | G | H | I | J | K | L | M | N | |
|---|---|---|---|---|---|---|---|---|---|---|---|---|---|---|---|---|
| Molasses I (Cane) | 20 | 17.06 | 4.46 | 8.66 | 8.66 | 17.56 | 18.26 | 11.86 | 10.06 | 10.66 | 18.06 | 13.76 | 8.66 | 17.3 | 6.8 | }30 lbs. |
| Molasses II (Am. Molasses) | | 9.4 | 22 | 17.8 | 17.8 | 8.9 | 8.2 | 14.6 | 16.4 | 15.8 | 8.4 | 12.7 | 17.8 | 9.2 | 19.7 | |
| Soybean oil meal | 10 | 3.54 | 3.54 | 3.54 | 3.54 | 3.54 | 3.54 | 3.54 | 3.54 | 3.54 | 3.54 | 3.54 | 3.54 | 3.54 | 3.54 | |
| Wheat bran | 20 | 20 | 20 | 20 | 20 | 20 | 20 | 20 | 20 | 20 | 20 | 20 | 20 | 20 | 20 | |
| Crushed oats | 60 | 60 | 60 | 60 | 60 | 60 | 60 | 60 | 60 | 60 | 60 | 60 | 60 | 60 | 60 | |
| Cracked corn | 84 | 84 | 84 | 84 | 84 | 84 | 84 | 84 | 84 | 84 | 84 | 84 | 84 | 84 | 84 | |
| Irradiated yeast (9F) | .2 | .2 | .2 | .2 | .2 | .2 | .2 | .2 | .2 | .2 | .2 | .2 | .2 | .2 | .2 | }170.2 lbs. |
| Salt | 2 | 2 | 2 | 2 | 2 | 2 | 2 | 2 | 2 | 2 | 2 | 2 | 2 | 2 | 2 | |
| Dicalcium Phosphate | 2 | 2 | 2 | 2 | 2 | 2 | 2 | 2 | 2 | 2 | 2 | 2 | 2 | 2 | 2 | |
| Bone Meal | 2 | 2 | 2 | 2 | 2 | 2 | 2 | 2 | 2 | 2 | 2 | 2 | 2 | 2 | 2 | |

The above rations were used in first trial. The control ration was altered by changes in the molasses and soybean oil meal contents only. The total protein of the lowest concentration molasses (B) was used as a base (22×11.2% Protein=2.46 lbs. of protein). On the basis of 2.46 lbs. of protein from each sample of molasses a total of 3.54 lbs. of soybean oil meal (38% Dig. Protein) was used as a base.

| | Ration A | |
|---|---|---|
| | Lbs. | Dig. Protein |
| Cane Molasses | 17.06 | |
| Ammoniated Molasses | 9.4 | 2.46 |
| Soybean Oil meal | 3.54 | 1.35 |
| Total | | 3.81 |

| | Ration B | |
|---|---|---|
| | Lbs. | Lbs. Protein |
| Cane Molasses | 4.46 | |
| Ammoniated Molasses | 22 | 2.46 |
| Soybean Oil Meal | 3.54 | 1.35 |
| Total | | 3.81 |

This is then equal to the 3.81 lbs. Dig. protein in 10 lbs. of soybean oil meal.

for the next seven days covering a total 14 day stabilization period. They were also fed extra leafy second cutting alfalfa hay ad libitum during this period.

During the experimental period the control and experimental groups all received six pounds of concentrate feed (Table VI) per day for 15 days. They were limited to three pounds of the same hay per day during this period. The protein content of the feed mixtures was low and the total intake was limited during the experimental period. This was done purposely so as to provide as severe a test as possible in order to define differences between samples of the ammoniated sugar-containing materials. The growth data are presented in Tables VII and VIII below. Except as specifically noted, the results shown represent the averages obtained from two calves fed the same rations.

Table VII
BODY WEIGHT

[Final data [2] on 15 day feeding trial. (Ammoniated product).]

| Group | Basal Period (14 Da.) | | | | Experimental Period (15 Da.) | | |
|---|---|---|---|---|---|---|---|
| | Beginning Weight | Gain | Per Cent Gain | Daily Gain | Gain | Per Cent Gain | Daily Gain |
| Control | 202 | 23 | 11.4 | 1.64 | 23 | 10.2 | 1.53 |
| A | 204 | 26 | 12.7 | 1.86 | 23 | 10.0 | 1.53 |
| B | 206.5 | 20.5 | 9.9 | 1.46 | 27.8 | 12.4 | 1.85 |
| C | 204 | 22.5 | 11.0 | 1.61 | 20.5 | 9.0 | 1.37 |
| D[1] | 181 | 19.0 | 10.5 | 1.36 | 24.5 | 12.3 | 1.63 |
| E | 204.5 | 23.0 | 11.2 | 1.64 | 19.5 | 8.6 | 1.30 |
| F | 197.5 | 25.0 | 12.7 | 1.79 | 27.0 | 12.1 | 1.80 |
| G | 194 | 26.5 | 13.7 | 1.89 | 25.0 | 11.3 | 1.67 |
| H | 194.5 | 22.5 | 10.4 | 1.61 | 21.3 | 9.8 | 1.42 |
| I | 191.5 | 25.0 | 13.0 | 0.90 | 19.5 | 9.0 | 1.30 |
| J | 213.5 | 34.0 | 15.9 | 2.40 | 32.0 | 12.9 | 2.13 |
| K | 196 | 24.5 | 12.5 | 1.75 | 20.5 | 9.3 | 1.37 |
| L | 197 | 21 | 10.7 | 1.50 | 21.0 | 9.6 | 1.40 |
| M | 204 | 31.5 | 15.4 | 2.25 | 34.5 | 14.6 | 2.30 |
| N | 209.5 | 24.0 | 11.5 | 1.71 | 36.5 | 15.6 | 2.43 |

[1] Data on only 1 calf, other suffered from pneumonia and not included.
Basal period—preliminary period of observation and stabilization.
Experimental period—Calves on ammoniated molasses with an equivalent amount of protein from each sample of molasses.
[2] All data expressed in lbs. except where designated as per cents.

Table VIII
HEIGHT AT THE WITHERS

[Final data [2] on 15 day feeding trial. (Ammoniated product).]

| Group | Basal Period (14 Da.) | | | | Experimental Period | | |
|---|---|---|---|---|---|---|---|
| | Beginning Height | Gain | Per Cent Gain | Daily Gain | Gain | Per Cent Gain | Daily Gain |
| Control | 88.5 | 3.4 | 3.8 | 0.24 | 2.3 | 2.5 | 0.15 |
| A | 86.5 | 2.7 | 3.1 | 0.19 | 2.4 | 2.7 | 0.16 |
| B | 87.1 | 1.9 | 2.2 | 0.14 | 3.4 | 3.8 | 0.23 |
| C | 88.8 | 1.9 | 2.1 | 0.14 | 2.1 | 2.3 | 0.14 |
| D[1] | 91.0 | 1.6 | 1.8 | 0.11 | 3.1 | 3.3 | 0.21 |
| E | 87.6 | 2.5 | 2.9 | 0.18 | 2.5 | 2.8 | 0.17 |
| F | 88.1 | 2.0 | 2.3 | 0.14 | 3.2 | 3.6 | 0.21 |
| G | 88.6 | 1.9 | 2.1 | 0.14 | 2.6 | 2.9 | 0.17 |
| H | 85.6 | 2.6 | 3.0 | 0.19 | 1.9 | 2.1 | 0.13 |
| I | 86.4 | 2.0 | 2.3 | 0.14 | 4.2 | 4.8 | 0.23 |
| J | 90.7 | 2.2 | 2.4 | 0.16 | 2.3 | 2.5 | 0.15 |
| K | 88.1 | 2.6 | 2.9 | 0.19 | 2.1 | 2.3 | 0.14 |
| L | 88.1 | 1.8 | 2.0 | 0.13 | 3.9 | 4.3 | 0.26 |
| M | 90.8 | 0.7 | 0.8 | 0.05 | 1.7 | 1.9 | 0.11 |
| N | 88.5 | 1.1 | 1.2 | 0.08 | 1.8 | 2.0 | 0.12 |

[1] Data on only 1 calf, other suffered pneumonia and not included.
Basal period—preliminary period of observation and stabilization.
Experimental period—calves on ammoniated molasses with an equivalent amount of protein from each sample of molasses.
[2] All data expressed in cm. except where designated as per cents.

The results of the above feeding tests show conclusively the efficacy of my new ammoniated sugar-containing product as a constituent of mixed feed for ruminants. It can also be used satisfactorily as an ingredient of other feedstuffs, the proportions of the materials used being regulated in accordance with the desired protein content of the finished feed and the availability of other nitrogen-containing materials for use in formulating the finished feed.

EXAMPLE VII

Continuous ammoniation of blackstrap molasses was effected by pumping a reaction mixture consisting of 0.6 lb. $NH_3$ and 9.35 lbs. blackstrap molasses at the rate of 9.35 lbs. of reaction mixture per hour and at a pressure of 60 pounds per square inch through 142 feet of ⅛ inch pipe in the form of a coil and heated to 130° C. The residence time of the reaction mixture in the reactor was 34.9 minutes. The product from the reaction contained 5.44% total N and 3.33% free $NH_3$.

Both liquid and gaseous ammonia have given satisfactory ammoniation in this type reactor at pressures ranging from 50 to 500 pounds per square inch with residence times ranging from 4 to 64 minutes and reaction temperature up to 150° C.

EXAMPLE VIII

Continuous ammoniation of citrus molasses was effected by pumping a reaction mixture consisting of 13.5 lbs. $NH_3$ and 538 lbs. citrus molasses at the rate of 30.3 lbs. of reaction mixture per hour and at a pressure of 125 pounds per square inch through 180 feet of ⅛ inch standard pipe in the form of a coil and heated to 120° C. The residence time of the reaction mixture in the reactor was 13.7 minutes. The product from the reactor contained 3.12% total N and 0.81% free $NH_3$.

Now having described my invention, what I claim is:

1. A method of converting ammonia into a nitrogen form readily assimilable by ruminants which comprises subjecting ammonia to reaction with a sugar-containing material selected from the group consisting of blackstrap molasses, inverted blackstrap molasses, hydrol syrup, wood sugar syrup, citrus molasses, and condensed distillers molasses solubles.

2. The process of claim 1 in which the reaction is carried out at temperatures ranging from 20 to 150° C.

3. The process of claim 1 in which the said reaction mixture is heated at temperatures ranging from 80 to 140° C. for a period of time ranging from ½ to ¼ hours.

4. A method of converting ammonia into a nitrogen form readily assimilable by ruminants which comprises reacting a sugar-containing material selected from the group consisting of blackstrap molasses, inverted blackstrap molasses, hydrol syrup, wood sugar syrup, citrus molasses and condensed distillers molasses solubles with an amount of ammonia sufficient to give a reaction product having a pH less than about 9.5 when substantially all of the ammonia is reacted with the sugar-containing material.

5. A method of converting ammonia into a nitrogen form readily assimilable by ruminants which comprises reacting a sugar-containing material selected from the group consisting of blackstrap molasses, inverted blackstrap molasses, hydrol syrup, wood sugar syrup, citrus molasses, and condensed distillers molasses solubles with an amount of ammonia sufficient to give a reaction product having a pH between about 7.5 and 9.5 when substantially all of the ammonia is combined with the sugar-containing material.

6. A process for ammoniating molasses which comprises adding ammonia to molasses and then heating the mixture so that substantially all of the ammonia is combined with the molasses.

7. The process of claim 6 wherein sufficient ammonia is added to give a reaction product having a pH between about 8 and 9.

8. A nitrogen-containing feed supplement for ruminants which comprises the reaction product of ammonia with a sugar-containing material selected from the group consisting of blackstrap molasses, inverted blackstrap molasses, hydrol syrup, wood sugar syrup, citrus molasses, and condensed distillers molasses solubles, said reaction product having a pH ranging from 7.5 to 9.5 and containing nitrogen in a form utilizable by ruminants.

9. A nitrogen-containing feed supplement for ruminants which comprises the reaction product of ammonia with a sugar-containing material selected from the group consisting of blackstrap molasses, inverted blackstrap molasses, hydrol syrup, wood sugar syrup, citrus molasses, and condensed distillers molasses solubles, said reaction product having a pH ranging from 7.5 to 9.5 and a protein equivalent of from 12.5 to 36 per cent.

HUGH R. STILES.

REFERENCES CITED

The following references are of record in the file of this patent:

UNITED STATES PATENTS

| Number | Name | Date |
|---|---|---|
| 2,293,845 | Millar | Aug. 25, 1942 |